(12) United States Patent
Glanz et al.

(10) Patent No.: US 6,385,530 B1
(45) Date of Patent: May 7, 2002

(54) METHOD FOR DETECTING A TUMBLE FLOW IN A CYLINDER CHAMBER OF AN INTERNAL COMBUSTION ENGINE

(75) Inventors: Reinhard Glanz, Graz; Franz Hödl, Kaindorf, both of (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/737,755

(22) Filed: Dec. 18, 2000

(30) Foreign Application Priority Data

Dec. 23, 1999 (AT) ............................................. 897/99 U

(51) Int. Cl.$^7$ ................................................. G01P 5/26
(52) U.S. Cl. ...................................... 701/101; 73/117.1
(58) Field of Search .............................. 701/101, 114; 73/116, 117.1

(56) References Cited

U.S. PATENT DOCUMENTS 5,072,613 A    12/1991 Baer et al. ................. 73/119 R
5,400,648 A  *  3/1995 Mahr ........................... 73/115

FOREIGN PATENT DOCUMENTS

| DE | 4133277 | | 4/1993 | |
|---|---|---|---|---|
| JP | 61-284665 | * | 12/1986 | ................. 356/337 |
| KR | 1998046974 | | 9/1998 | |
| KR | 10-0208854 | | 4/1999 | |

OTHER PUBLICATIONS

N.S. Jackson et al., "Correlation of the Combustion Characteristics . . . Water Analogy Rig" in SAE, 971637, May 5–8, 1997.
G. Tippelmann, "Räumlicher Drallmesser für Drall– und Tumblemessung" (Spatial Swirl Measuring Apparatus for Swirl and Tumble Measurement) MTZ 58 (1997), No. 6, p. 327, 363.

* cited by examiner

Primary Examiner—Andrew M. Dolinar
(74) Attorney, Agent, or Firm—Dykema Gossett PLLC

(57) ABSTRACT

For the purpose of detecting a tumble flow in a cylinder chamber of an internal combustion engine, with a characteristic tumble value being determined as a quotient from an angular velocity $\omega_{FK}$ of the tumble movement and an angular velocity $\omega_{Mot}$ of the internal combustion engine, a method is proposed in which the asymmetry of a flow field $w_{LDA}$ in the cylinder chamber is detected for a predetermined number of measuring points i with a differential measuring method on a flow test stand and the characteristic tumble value is determined as a result of the asymmetry of the flow field $w_{LDA}$.

Characteristic tumble values can thus be determined in a simple and practical manner.

9 Claims, 1 Drawing Sheet

METHOD FOR DETECTING A TUMBLE FLOW IN A CYLINDER CHAMBER OF AN INTERNAL COMBUSTION ENGINE

BACKGROUND OF THE INVENTION

The invention relates to a method for detecting a tumble flow in a cylinder chamber of an internal combustion engine, with a characteristic tumble value being determined as a quotient of an angular velocity $\omega_{FK}$ of the tumble movement and an angular velocity $\omega_{Mot}$ of the internal combustion engine.

The charge movement is a parameter both in spark ignition engines as well as diesel engines which essentially influences the combustion. Principally, one distinguishes between swirl, a charge movement about the cylinder axis, and tumble, a charge movement about an axis perpendicular to the cylinder axis, with both charge movements often occurring simultaneously in mixed form. In order to detect both types of charge movement, integrative methods are now generally used on the testing stand for stationary flows, which methods can supply summary results very quickly. In the case of swirl, the integrative measurement methods supply favorable correlations between the combustion result and the swirl measurement, because the swirl is substantially maintained during the piston stroke. In the case of tumble, however, the correlation between the results on the testing stand for the flow and the combustion result leads to a rather confusing picture. The reason is that the tumble is virtually squashed between the piston and the cylinder head base and dissolves into complex flow structures and, finally, into turbulence.

DESCRIPTION OF THE PRIOR ART

Various types of integrative measurement methods are known. It is known, for example, to measure the swirl on the testing stand for the flow with the help of a moment measuring device or a rotary wing for a number of valve lifts and to determine therefrom a swirl count by integration over the crank angle. Although other flow structures occur in a real engine than on a testing stand for stationary flows, the results can be correlated favorably with the combustion results. Integrative measuring methods are also known for detecting the tumble charge movement in the cylinder chamber. From the publication SAE 97 16 37 with the title "Correlation of the Combustion Characteristics of Spark Ignition Engines with the In-Cylinder Flow Field Characterized Using PIV in a Water Analogy Rig", JACKSON, N.S., et al. the so-called "T-piece method" is known. The cylinder head is placed on a T-piece, with integrative measuring instruments such as rotary wings or moment measuring instruments being arranged in a part of the transverse pipe. The asymmetrical flow from the inlet port subsequently impinges on the transverse pipe in which a swirl flow is produced as a result of the asymmetry. The angle of the tumble can also be detected by rotating the cylinder head until the maximum measured value is reached.

It is further known from DE 41 33 277 A1 to use a rotating ring in the cylinder chamber to detect the tumble, with the rotational axis of said ring being disposed normal to the central axis of the cylinder chamber. In contrast to the other stationary flow measurements, the cylinder chamber is closed off at the bottom by a dummy piston and, in addition, the air is evacuated on the side in the zone of the rotary wing axis. As a result of the asymmetrical impingement of the air jet on the dummy piston a rotational movement is induced which is detected via the rotational speed of the rotating ring. The tumble angle is obtained by turning the position of the rotating ring or the cylinder head towards the position with the maximum ring speed.

From the article "Räumlicher Drallmesser für Drall- und Tumble-Messung" (Spatial Swirl Measuring Apparatus for Swirl and Tumble Measurement), TIP-PELMANN, G., MTZ 58 (1997), No. 6, page 327 it is known to use a moment measuring instrument for the integrative measurement of the tumble flow which consists of a spherical flow rectifier. As a result of its radially arranged rectifier bores, the spherical rectifier is not only able to detect a moment of momentum about the z-axis, but also a moment of tilt about an axis in the x-y-plane and can thus respond very elegantly to the asymmetry of the flow field. Since all three spatial moments are detected, swirl, tumble and angle of tumble are obtained from a single measurement. The flow resistance of the rectifier and the thus following reaction on the flow field have a disadvantageous effect on the result of the measurement, however.

SUMMARY OF THE INVENTION

It is the object of the present invention to provide a method with which the tumble flow in the cylinder chamber of an internal combustion engine can be detected as precisely as possible.

The method in accordance with the invention provides that the asymmetry of a flow field $w_{LDA}$ in a cylinder chamber is detected with a differential measuring method on the testing stand for the flow for a predetermined number of measuring points i and the characteristic tumble value is determined on the basis of the asymmetry. A reduced flow field $w_i$ is preferably determined according to the equation $$w_i = w_{LDA} - \overline{w},$$

with $\overline{w}$ being the central axial flow speed of the flow field $w_{LDA}$. Particularly favorable results can be achieved when the characteristic tumble value is calculated on the basis of the angular velocity $\omega_i$ for each measuring point i according to the equation $$\omega_i = \frac{w_i}{r_i},$$

with $r_i$ being the distance of the measuring point i from the central axis of the cylinder chamber. An element of surface $f_i$ is preferably assigned to each measuring point i and the angular velocity of the tumble movement $\omega_{FK}$ is calculated according to the equation $$\omega_{FK} = \frac{\sum \omega_i \cdot r_i^2 \cdot f_i}{\sum r_i^2 \cdot f_i}.$$

In contrast to the known integrative methods, a differential measurement method is used in the method in accordance with the invention in order to detect the flow field in the cylinder chamber in its structure. Any random integral parameters can then be derived from said structure.

The measurement is performed with a stationary testing stand for the flow on the pistonless cylinder chamber which opens into a calming vessel. The method in accordance with the invention makes use of the finding that the size of the tumble occurring in the cylinder chamber of the internal combustion engine is proportional to the magnitude of the asymmetry of the axial flow structure in the pistonless cylinder chamber of the stationary flow testing stand.

It is preferably provided that laser Doppler anemometry is used as the differential measurement method, with the measurement being performed in a measuring plane normal to the axis of the cylinder chamber. The measuring volume of a laser Doppler anemometry system is moved through many points in a measuring plane at a distance from the cylinder head base which corresponds to half the bore diameter of the cylinder chamber. The axial flow field is thus detected. In order to obtain measuring results with high relevance, it is advantageous when at least 200 measuring points i are arranged at the same distance from one another in the measuring plane. It has been noticed that in the case of less than 200 measuring points the characteristic tumble values fluctuate to such a high extent that reproducible measurements can hardly be performed.

It is provided for in a preferred embodiment of the invention that the elements of surface $f_i$ which are assigned to each measuring point i are arranged in a hexagonal grid. The hexagonal grid ensures that the elements of surface $f_i$ are all the same.

BRIEF DESCRIPTION OF THE DRAWINGS

The invention is now explained in closer detail by reference to the enclosed schematic drawings, wherein.

DETAILED DESCRIPTION OF THE PREFERRED EMBODIMENTS

Figure 1:
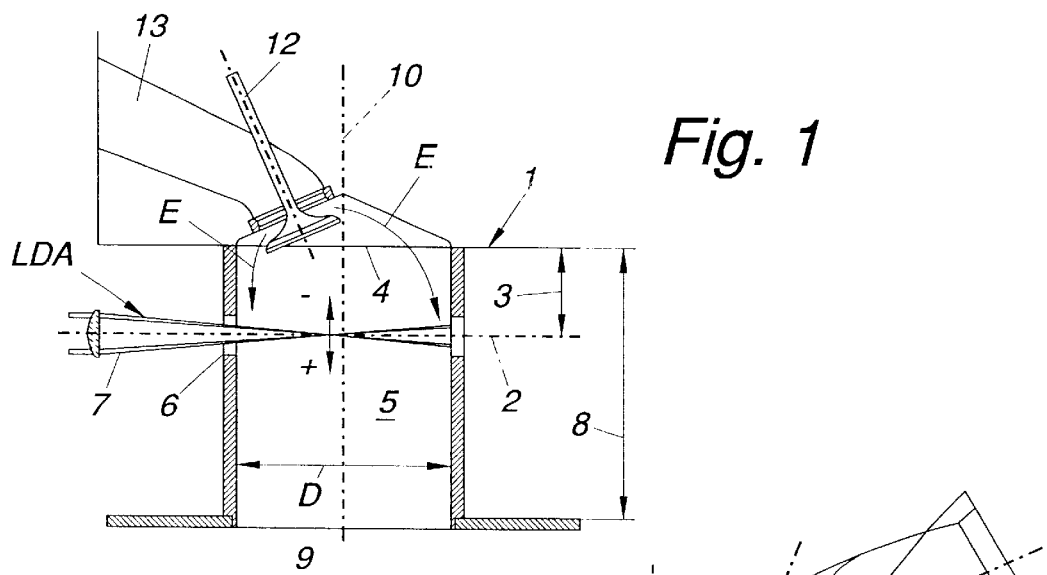
FIG. 1 shows the principal measuring set-up in a flow test stand.

FIG. 1 shows a principal measuring set-up for a differential measuring method with a stationary flow test stand 1, with laser Doppler anemometry LDA being used as a measuring system. The measuring volume of a laser Doppler anemometry system LDA is moved through numerous measuring points i in a measuring plane 2 at a distance 3 from the cylinder head floor 4 which corresponds to half the diameter of bore D of the cylinder chamber 5. The measuring light 7 reaches the cylinder chamber 5 via a glass cylinder 6. The axial flow field is detected with the differential measuring method. The entire length 8 of the cylinder chamber 5 is approx. 2.5 times the diameter of bore D. A calming vessel 9 is adjacent to the cylinder chamber 5.

A characteristic Tumble value $\omega_{FK}$ is calculated by $\omega_{Mot}$ from the flow field $w_{LDA}$ which is measured by the differential measuring method by means of laser Doppler anemometry LDA. A mean axial flow speed $\overline{w}$ is calculated at first from the flow field $w_{LDA}$, i.e. the measured axial speeds in the direction of the longitudinal axis 10 of the cylinder chamber 5. By reducing the flow field $w_{LDA}$ by the mean speed $\overline{w}$ the reduced, quasi-rotating flow field $w_i$ follows under the assumption of a tumble axis 11 which passes through the central point 10a of the cylinder and stands perpendicular to the central axis 10 of the cylinder chamber 5. The following thus applies:

$$w_i = w_{LDA} - \overline{w}. \tag{1}$$

From said reduced flow field $w_i$ the angular velocity $\omega_i$ in each measuring point i is calculated as follows:

$$\omega_i = \frac{w_i}{r_i}, \tag{2}$$

with $r_i$ being the distance of the measuring point i from the tumble axis 11.

If each measuring point i is assigned the surface element $f_i$, the angular velocity $\omega_{FK}$ of the entire tumble movement is obtained by the equation $$\omega_{FK} = \frac{\sum \omega_i \cdot r_i^2 \cdot f_i}{\sum r_i^2 \cdot f_i}. \tag{3}$$

The characteristic tumble value can be calculated as follows therefrom:

$$tumble-value = \frac{\omega_{FK}}{\omega_{Mot}}, \tag{4}$$

with $\omega_{Mot}$ being the engine angular velocity of the internal combustion engine.

If the characteristic tumble values are determined for several valve lifts of the intake values 12 of the intake ports 13, the tumble figure can be thus calculated by means of integration via the crank angle $\alpha$, with the characteristic tumble values being weighted with the piston velocity c:

$$tumble-figure = \frac{1}{\pi} \cdot \int_{\alpha=0}^{\pi} \frac{\omega_{FK}}{\omega_{Mot}} \cdot \left(\frac{c(\alpha)}{c_m}\right)^2 \cdot d\alpha. \tag{5}$$

Figure 2:
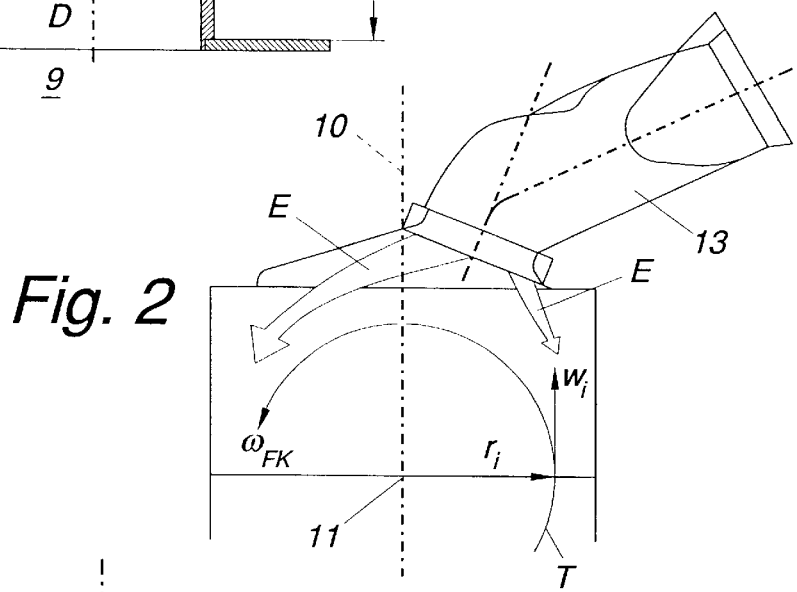
FIG. 2 shows a longitudinal sectional view through a cylinder chamber with the calculated tumble flow.
Figure 3:
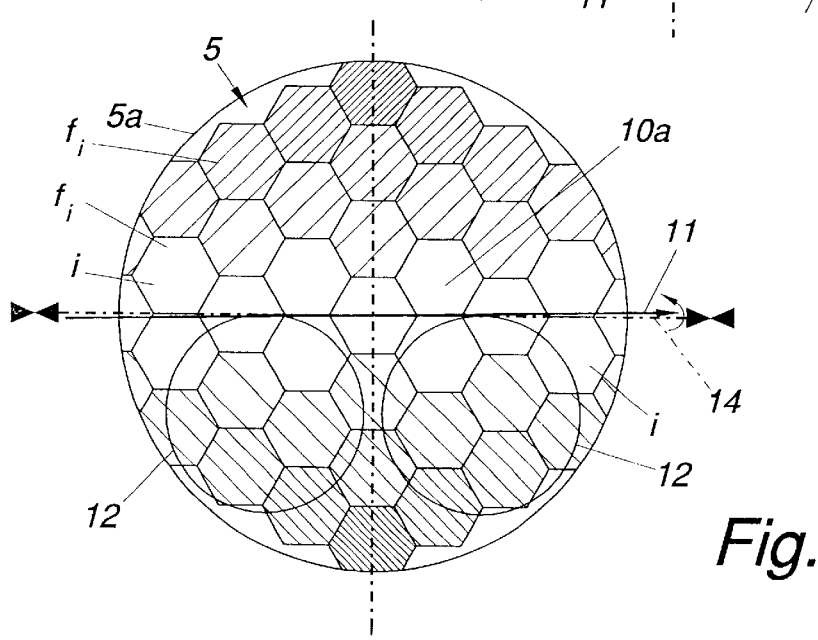
FIG. 3 shows a cross-sectional view through the cylinder chamber with an entered flow field.

FIG. 3 shows a typical measurement result of the measuring method in accordance with the invention, entered in a cross section through the cylinder chamber 5. It shows a flow structure in a cylinder chamber 5 produced by intake ports 13 as standardized flow fields. The intake valves 12 are shown in their position to the cylinder 5a. The longitudinal axis 14 of the engine is also entered. The tumble axis 11 is indicated as a vector arrow with indicated direction of rotation. The measuring points i are arranged in a hexagonal grid, so that the surface elements $f_i$ are all the same. The direction and size of the angular velocities $\omega_i$ in each surface element $f_i$ are indicated by the inclination and density of the hatched lines. Hatched lines inclined to the right mean downwardly directed flow; hatched lines to the left symbolize an upwardly directed flow. The density of the hatched lines is proportional to the magnitude of the speed. The lowest flow speed prevails in the zone of the longitudinal axis 14, which is represented by the hexagonal surface elements $f_i$ without any hatched lines. The calculated flow profile shown in FIG. 3 corresponds to the tumble flow T according to intake flow E as exhibited in FIG. 2.

In order to provide FIG. 3 with more clarity only 37 measuring points per measuring plane 2 have been entered. In order to obtain reproducible measuring results however, at least 200 measuring points per measuring plane 2 should be used in practice.

What is claimed is:

1. A method to detect a tumble flow in a cylinder chamber of an internal combustion engine, with a characteristic tumble value being determined as a quotient of an angular velocity $\omega_{FK}$ of the tumble movement and an angular velocity $\omega_{Mot}$ of the internal combustion engine, wherein the asymmetry of a flow field $w_{LDA}$ in the cylinder chamber is detected with a differential measuring method at a flow test stand for a predetermined number of measuring points i and the characteristic tumble value is determined as a result of the asymmetry of the flow field $w_{LDA}$.

2. A method according to claim 1, wherein the characteristic tumble value is determined as a result of a reduced flow field $w_i$ according to the equation $$w_i = w_{LDA} - \overline{w},$$

with $\overline{w}$ being the mean axial flow speed of the flow field $w_{LDA}$.

3. A method according to claim 1, wherein the characteristic tumble value is determined as a result of the angular velocities $\omega_i$ for several measuring points i according to the equation $$\omega_i = \frac{w_i}{r_i},$$

with $r_i$ being the distance of the measuring point i from a central axis of the cylinder chamber.

4. A method according to claim 1, wherein each measuring point i is assigned a surface element $f_i$ and the angular velocity $\omega_{FK}$ of the tumble movement is determined as a result of an averaging of the angular velocities $\omega_i$ weighted over all measuring points i.

5. A method according to claim 4, wherein the angular velocity $\omega_{FK}$ of the tumble movement is calculated according to the equation $$\omega_{FK} = \frac{\sum \omega_i \cdot r_i^2 \cdot f_i}{\sum r_i^2 \cdot f_i}.$$

6. A method according to claim 1, wherein laser Doppler anemometry is used as the differential measuring method, with the measurement being performed in a measuring plane which is normal to the central axis of the cylinder chamber.

7. A method according to claim 1, wherein the measuring plane is placed at a distance from the cylinder head floor which corresponds to half the diameter of bore of the cylinder chamber.

8. A method according to claim 1, wherein at least 200 measuring points i are arranged at the same distance from one another in the measuring plane.

9. A method according to claim 1, wherein the surface elements $f_i$ which are assigned to each measuring point i are arranged in a hexagonal grid.

* * * * *